Oct. 1, 1968   M. SIMKO   3,403,883
APPARATUS FOR PRODUCING INLAID ARTICLES
Filed May 6, 1965

INVENTOR.
MICHAEL SIMKO
BY~ Westell & Hanley
PATENT AGENTS

United States Patent Office 3,403,883
Patented Oct. 1, 1968

3,403,883
**APPARATUS FOR PRODUCING
INLAID ARTICLES**
Michael Simko, London, Ontario, Canada, assignor to Northern Electric Company Limited, Montreal, Quebec, Canada
Filed May 6, 1965, Ser. No. 453,685
3 Claims. (Cl. 249—95)

ABSTRACT OF THE DISCLOSURE

A mold for forming inlaid articles of plastic material, in which the male half of the die carries a plurality of projecting pins adapted to bear against the rear face of a slotted blank in the die cavity whereby the male half is spaced from the blank to allow the flow of inlay material over the rear face of the blank and into the slots but not over the front face of the blank. The pins are withdrawn with the male half after the inlay material has set.

---

The present invention relates to the moulding of articles and more particularly to apparatus for producing inlaid articles of differing components.

Articles having inlaid characters, indicia, or other patterns are in common use in a number of products, for instance as a dial plate on a telephone set. Such plates have been commonly formed by first producing a blank with a character-defining slot or slots extending between its front and rear faces. The blank is then fitted into the cavity of a second mould and a plastic material of a colour contrasting with the colour of the blank is injected into the mould across the back of the blank. When the plastic material flows over the back of the blank it enters the slot and forms the characters. The front face of the blank is positioned flush with the abutting wall of the mould so that on completion of the operation the front face of the finished plate will present an uninterrupted surface. The plastic material when set is anchored to the blank of normal adhesion.

One problem arising from the above-mentioned method is that, in the absence of pressure between the front face of the preformed slotted blank and the abutting wall of the mould cavity the plastic material flows out from the slot over the front face of the blank and forms flash, resulting in rejected parts. To obtain the required pressure between the blank and the abutting wall it has previously been proposed to provide random projections on the rear face of the preformed blank against which the male half of the mould will bear when the mould is closed. Such a method is disclosed in United States Patent No. 2,663,910 issued Dec. 29, 1953 to E. L. Danielson et al. However, the presence of such projections gives rise to certain disadvantages. In the first place the projections, which are of plastic material, tend to bleed by melting slightly as the hot plastic material of the second shot flows past them under high pressure. The resultant discoloured second plastic material detracts from the quality of the finished product. Secondly, the presence of numerous projections have an undesirable baffling effect on the flow of the second plastic material and requires a higher injection pressure and a higher temperature of the plastic material in order to produce a satisfatcory product. This results in a more critical operation and consequently a higher product rejection ratio. Thirdly, a multiplicity of projections increases the amount of plastic material used in forming the blank and hence increases the cost of the article.

The present invention overcomes these disadvantages by utilizing a mould having projections in the form of pins located in the male half of the mould rather than on the blank. These consist of a number of pins which are positioned, when the mould is closed, to bear against the rear face of the slotted blank set in the cavity of the female half of the mould. The pins may be spring-loaded, and further they may be preadjustable, to provide an accurate bearing pressure on the blank over and above the basic pressure provided by the male half of the mould. Preferably the pins are positioned to bear on the blank adjacent the slot or slots. The male half of the mould is spaced a predetermined distance from the rear face of the blank and this allows the plastic material to be injected across the rear face and into the slot of the blank. When the plastic material has set, the male half of the mould carrying the pins is removed, the pins being withdrawn from the plastic material which has set integral with the blank to form the finished article. The resulting finished article is free of flash and the appearance of the characters is not marred by discolouration. Also, less material is used to form the product since no projections are formed on the blank and, although they are displaced by a comparative amount of plastic material, less of the latter material is used as the pins displace some of that plastic. The use of less plastic of course decreases the cost of manufacturing the article.

The invention will now be described with reference to an example embodiment illustrated in the accompanying drawings in which.

Figure 1:
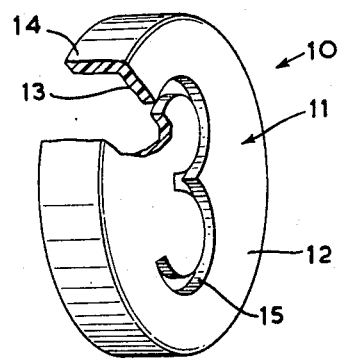
FIGURE 1 is a perspective view, partly broken away, of a blank used in the invention.

As mentioned, FIGURE 1 illustrates a blank 10 used in the invention. Blank 10 of the example embodiment is of the type used in capping typewriter or adding machine keys. The body of blank 10 consists of a flat disc portion 11 having a front face 12 and a rear face 13. A flange 14 circumscribes disc 11 and is normal to it. A slot 15 in the configuration of a character to be inlaid in blank 10 extends from front face 12 to rear face 13 of disc 11, the sidewalls of slot 15 being perpendicular to faces 12 and 13. Blank 10 may be formed in a conventional manner, for instance by moulding.

Figure 2:
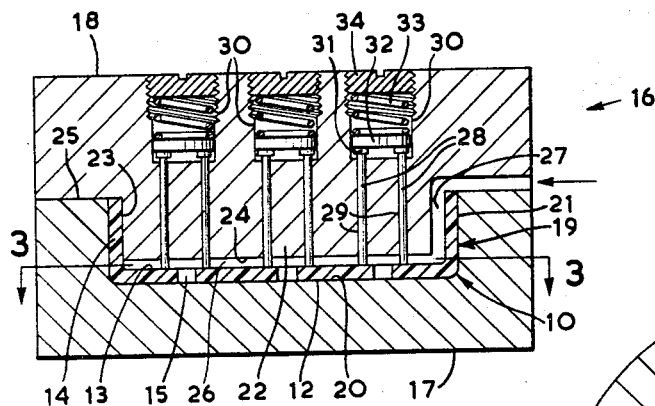
FIGURE 2 is a cross-section in elevation of a mould according to the invention with the slotted blank of FIGURE 1 placed therein.

Now referring to Figure 2 of the drawings, that figure illustrates a mould 16 according to the invention. Mould 16 consists of a female half 17 and a male half 18 adapted to be closed in co-operation one with the other. Female half 17 contains a cavity 19 adapted to receive blank 10, that is, the configuration of cavity 19 conforms to the outer surface of blank 10 with a bottom wall 20 and an upstanding angular side wall 21. Male half 18 of mould 16 carries a centrally located projection 22 having an upstanding side wall 23 and a leading face 24. Projection 22 is adapted to fill the major portion of cavity 19 of female half 17 when halves 17 and 18 are brought together. Female half 17 and male half 18 each carry a flat bearing surface 25 circumscribing cavity 19 and projection 22 respectively, and adapted to abut one another when halves 17 and 18 are brought together, as shown in FIGURE 2.

Projection 22 of male half 18 is further configured in a manner such that when cavity 19 of female half 17 contains a blank 10, side wall 23 of the projection will be positioned flush against the inner surface of flange 14 of the blank while leading face 24 of the projection is separated a predetermined distance from rear face 13 of blank 10 to provide a space 26 in closed mould 16. In one location on male half 18 a sprue 27 runs up side wall 23 of projection 22 and across bearing surface 25 to its outer edge for injection of molten plastic material into space 26.

Male half 18 of mould 16 carries a plurality of steel pins 28, each of small transverse cross-section, which project from the leading face 24 of projection 22 and are adapted to bear against rear face 13 of blank 10 when mould 16 is closed. Pins 28 are slideable longitudinally each in a passage 29 which extends from leading face 24 of projection 22 into a plurality of cylindrical threaded bores 30 located in the outer surface of male half 18. In the illustrated embodiment two pins 28 are associated with each bore 30. Each pin 28 terminates in a cap 31 in bore 30. A pressure pad 32 is positioned in a transverse plane of each bore 30 and is adapted to move longitudinally within that bore. Pad 32 bears against caps 31 on the ends of pins 28. One end of a compression spring 33 bears against each pad 32 to maintain pressure on pins 28. The other end of compression spring 33 bears against a lock nut 34 threaded into the end of each bore 30 adjacent the outer surface of male half 18.

Figure 3:
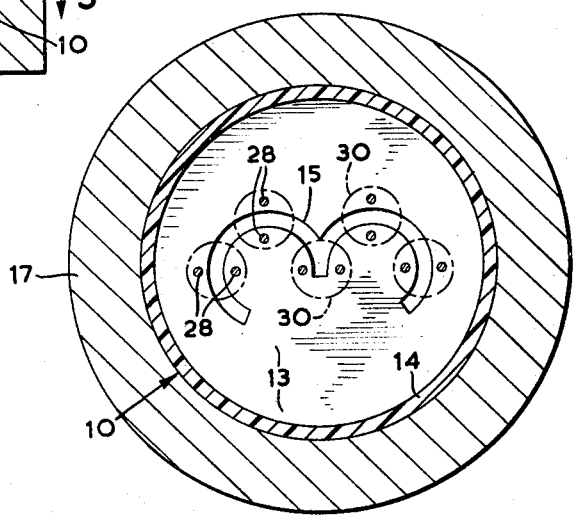
FIGURE 3 is a cross-section taken along the line 3—3 of FIGURE 2.

As seen in FIGURE 3, pairs of pins 28 are positioned to straddle slot 15 in blank 10 at different locations throughout the length of the slot. It will be seen that there are a relatively small number of pins 28 located strategically on either side of slot 15 throughout its length.

In the operation of the device, blank 10 is placed in cavity 19 of female half 17. Male half 18 is then placed in co-operation with female half 17 to close mould 16 with annular bearing surfaces 25 abutting one another. Side wall 23 of projection 22 will fit flush against flange 14 of blank 10 while pins 28 will bear against rear face 13 of blank 10 along each side of slot 15. By having pins 28 extend outwardly from projection 22 a distance greater than the depth of space 26, the pins will bear against back 13 of blank 10 under pressure applied through pads 32 by means of compression springs 33. This pressure may be adjusted by turning lock nuts 34 in treaded bores 30. The adjusted pressure is that which will ensure that front face 12 of blank 10 lies against bottom wall 20 of cavity 19 to give no chance for the plastic material filling space 26 and slot 15 to flow under the slot and form flash on the front face of the blank adjacent the slot. It is for this reason that pins 28 are located as shown in FIGURE 3 of the drawings.

With mould 16 closed and the pressure of pins 28 properly adjusted, molten plastic material is injected under pressure into sprue 27 and flows past and around pins 28 to fill space 26 and slot 15. Sprue 27 is then sealed and the plastic material is allowed to set, cure or harden, the manner depending upon the type of plastic material used. When the plastic material has set mould 16 is opened by removing male half 18. The finished article is then removed from cavity 19 of female half 17 and the spur of set plastic material having been formed in the outer portion of sprue 27 is removed.

Figure 4:
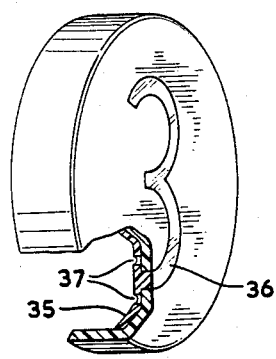
FIGURE 4 is a perspective view of a finished article made in accordance with the invention.

The finished article shown in FIGURE 4 of the drawings includes a backing 35 formed by the set plastic material introduced into mould 16. The set plastic also completely fills slot 15 to form a character inlay 36 clearly outlined in front face 12 of the finished article. By using materials of contrasting colours the inlay will be clearly delineated. It will be noted there are a series of small holes 37 in backing 35 adjacent inlay 36; these holes are formed by the withdrawal of pins 28 when mould 16 is opened.

It will be appreciated that different types of materials may be used in producing an article in accordance with the invention. For instance blank 10 may be preformed of plastic sheet while the plastic injected into mould 16 may for instance be a thermoplastic or thermosetting resin. Also the characters of indicia may be of any form and design or the inlay may be a pattern.

I claim:
1. A mould for forming inlaid articles of plastic material, comprising a female half and a male half, the female half having a cavity adapted to receive a blank having a front face and a rear face and slotted therebetween with the front face of the blank bearing flush against a wall of the cavity, the male half having a plurality of pins projecting therefrom adapted when the mould is closed to project into the cavity of the female half and against the rear face of said blank received in said cavity whereby the front face of the blank is urged under pressure against the wall of the cavity, the pressure exerted by the pins against the blank when the mould is closed being adjustable, the male half being spaced a predetermined distance from the rear face of the blank, and a spruce opening into said space.

2. A mould for forming inlaid articles of plastic material, comprising a female half and a male half, the female half having a cavity adapted to receive a blank having a front face and a rear face and slotted therebetween with the front face of the blank bearing flush against a wall of the cavity, the male half having a plurality of pins projecting therefrom adapted when the mould is closed to project into the cavity of the female half and against the rear face of said blank received in said cavity whereby the front face of the blank is urged under pressure against the wall of the cavity, each of said pins being slideable in the male half of the mould and projecting at one end from the front face thereof, at least one bore in the outer face of the male half into which the other end of each pin protrudes, and adjustable pressure means in said bore bearing against said other end of one bore in the outer face of the male half into which the mould is closed is adjustable, the male half being spaced a predetermined distance from the rear face of the blank, and a sprue opening into said space.

3. A mould as claimed in claim 2 in which the pressure means comprises a pad bearing against said other end of each pin and a compression spring a lock nut adjustable in said bore along the axis of the spring, one end of said spring bearing against said pad and the other end of said spring bearing against said lock nut.

References Cited
UNITED STATES PATENTS

| 2,609,570 | 9/1952 | Danielson et al. | 264—274 |
| 3,238,287 | 3/1966 | Chapman | 264—328 |
| 3,243,752 | 3/1966 | Lawrence | 264—272 |

ROBERT F. WHITE, *Primary Examiner.*

J. HALL, *Assistant Examiner.*